United States Patent [19]

Tabata et al.

[11] Patent Number: 5,231,618
[45] Date of Patent: Jul. 27, 1993

[54] OPTICAL DISC SYSTEM

[75] Inventors: Tsutomu Tabata; Shizuo Nagata; Yasuhiro Suzuki, all of Tokyo, Japan

[73] Assignee: Oki Electric Industry Co., Ltd., Tokyo, Japan

[21] Appl. No.: 831,984

[22] Filed: Feb. 6, 1992

[30] Foreign Application Priority Data

Feb. 19, 1991 [JP] Japan .................. 3-024835

[51] Int. Cl.$^5$ .............................................. G11B 7/00
[52] U.S. Cl. ............................ 369/44.34; 369/44.26; 369/44.29; 369/44.35
[58] Field of Search ............. 369/44.34, 44.25, 44.26, 369/44.28, 44.29, 44.35, 44.36, 44.41, 50

[56] References Cited

U.S. PATENT DOCUMENTS

| | | | |
|---|---|---|---|
| 4,611,317 | 9/1986 | Takeuchi et al. | 369/44.34 |
| 4,747,089 | 5/1988 | Eguchi et al. | 369/44.34 |
| 4,795,958 | 1/1989 | Nakamura et al. | 369/44.34 |
| 5,070,491 | 12/1991 | Horie | 369/44.34 |
| 5,146,443 | 9/1982 | Twase et al. | 369/44.35 |

Primary Examiner—Robert J. Pascal
Assistant Examiner—Tan Dinh
Attorney, Agent, or Firm—Spencer, Frank & Schneider

[57] ABSTRACT

An optical disc system is provided with a focusing error signal generator for detecting any focusing error from light reflected by an optical disc and outputting a focusing error signal; a driver for outputting a focusing drive current on the basis of the focusing error signal; and an actuator for shifting an optical pickup in a focusing direction in accordance with the focusing drive signal. The optical disc system also has a signal detection and processing unit for detecting each index point (ID) on the optical disc and generating an index gate signal indicating an address between the index point and another index point next to the first-mentioned index point in the tracking direction; and an inter-ID holder for holding, based on the index gate signal, the focusing error signal at a signal level right before the first-mentioned index point.

3 Claims, 5 Drawing Sheets

PRIOR ART

OPTICAL DISC SYSTEM

BACKGROUND OF THE INVENTION

1) Field of the Invention

This invention relates to an optical disc system or magneto-optic disc system (hereinafter collectively called the "optical disc system" for the sake of simplicity), and specifically to an optical disc system designed to prevent noise while an optical disc is driven.

2) Description of the Related Art

An optical disc system of the above type is equipped with an optical pickup means for radiating an optical beam onto an optical disc, detecting any focusing error and tracking error (i.e., any tracing error for a desired track of the optical disc) from light reflected by the optical disc, and outputting a focusing error signal and a tracking error signal; a drive means for outputting a focusing drive current and a tracking current signal on the basis of the focusing error signal and tracking error signal, respectively; and an actuator for shifting the optical pickup means in focusing and tracking directions in accordance with the focusing drive current and tracking drive current, respectively.

In the above optical disc system, the optical disc is rotated by a spindle motor, and the actuator is operated by currents outputted from the drive means on the basis of the focusing error signal and the tracking error signal both outputted from the optical pickup means. Feedback (servo) control is performed by means of the actuator, whereby the optical pickup means is shifted in the focusing and tracking directions to eliminate the focusing and tracking errors. Information of the optical disc is read in this manner.

FIG. 8 is a perspective view of an optical disc, while FIG. 9 is an enlarged view of an index point (hereinafter called the "ID point") of the optical disc.

In the optical disc 1, address information such as track numbers and sector numbers are formatted beforehand at such ID points. Each ID point is located at the leading end of its corresponding sector and, as is shown in FIG. 9, contents such as the address of the corresponding data area are recorded by pits 2.

When an optical beams passes across the ID point, influence by the pits 2 appears in a focusing error signal. Namely, the optical pickup means detects the pits 2, and the detection of the pits 2 results in periodical focusing errors which take place whenever the pickup means passes across the ID points. These focusing errors cause the actuator to undergo minute mechanical vibrations.

FIG. 10 is a waveform diagram showing the waveforms of a focusing error signal AF and a focusing drive current FS. It is observed that their waveforms peak out at each place where an optical beam passes across an ID point. Each waveform section indicated by "α" in FIG. 10 reflects the influence of pits 2 at an ID point, whereas each waveform section designated by "β" reflects a response to a focusing servo to the section α.

The disturbance β by this focusing servo occurs in every sector, and the period T(s) of the waveform β can be expressed by the following formula (1):

$$T = \frac{1}{(N/60) \times M} \; (s) \quad (1)$$

where

N: revolution number of the disc (rpm),

M: number of sectors.

On the other hand, the frequency f can be defined by the following formula (2):

$$f = \frac{1}{T} = \frac{N}{60} \times M \; (Hz) \quad (2)$$

With the formula (2) in view, the frequency f when the revolution number and sector number are set, for example, at 3,600 rpm and 17, respectively, can be given by the following formula (3):

$$f = \frac{3,600}{60} \times 17 = 1,020 \; (Hz) \quad (3)$$

Incidentally, the frequency f is proportional to the disc revolution number N as is easily understood from the formula (2). A reduction in the revolution number of the disk, therefore, makes it possible to reduce vibrations of the actuator to an extent such that they no longer cause noise detectable by the human ear. Optical disc systems driven at a low revolution number, therefore, do not cause a noise problem. However, the frequency $f \approx 1$ KHz in the focusing direction as determined by the formula (3) causes the human ear to detect substantial noise substantial noise.

If the disc revolution number N is reduced in view of the effect of vibrations of the actuator to the human ear, the noise can be lowered. A reduction in the disc revolution number N, however, leads to a lowered data transfer rate (the term "data transfer rate" means the speed at which data recorded on the optical disc 10 are read and then transferred to a control unit or the speed at which writing data from the control unit are written on the optical disc 1), thereby making it impossible to maintain the performance as an optical disc system. It has hence been difficult to increase the disc revolution number N and, at the same time, reduce the noise.

SUMMARY OF THE INVENTION

An object of the present invention is, therefore, to provide an optical disc system which permits sure elimination of noise without lowering the data transfer rate.

To achieve the object described above, the present invention provides an optical disc system comprising:

an optical pickup means for radiating an optical beam onto an optical disc with plural index points formed thereon, detecting any focusing error and any tracking error from light reflected by the optical disc, and then outputting a focusing error signal and a tracking error signal to a focusing servo control signal system and a tracking servo control system, respectively;

a drive means for outputting a focusing drive current and a tracking drive current on the basis of the focusing error signal and tracking error signal, respectively;

an actuator for shifting the optical pickup means in a focusing direction and in a tracking direction by the focusing drive current and tracking drive current, respectively;

a signal detection and processing means for detecting each of the index points and generating an index gate signal indicating an address between the index point and another index point next to the first-mentioned index point in the tracking direction; and a holding means for holding, based on the index gate signal, the focusing error signal for a predetermined time at a signal level right before the first-mentioned index point.

According to the optical disc system of this invention, focusing servo can be smoothly conducted even when an optical beam passes across an ID point, thereby making it possible to eliminate noise in a focusing direction even when the optical disc is rotated at a high speed.

DESCRIPTION OF THE PREFERRED EMBODIMENT

The preferred embodiment of the present invention will hereinafter be described in detail with reference to the accompanying drawings.

Figure 1:
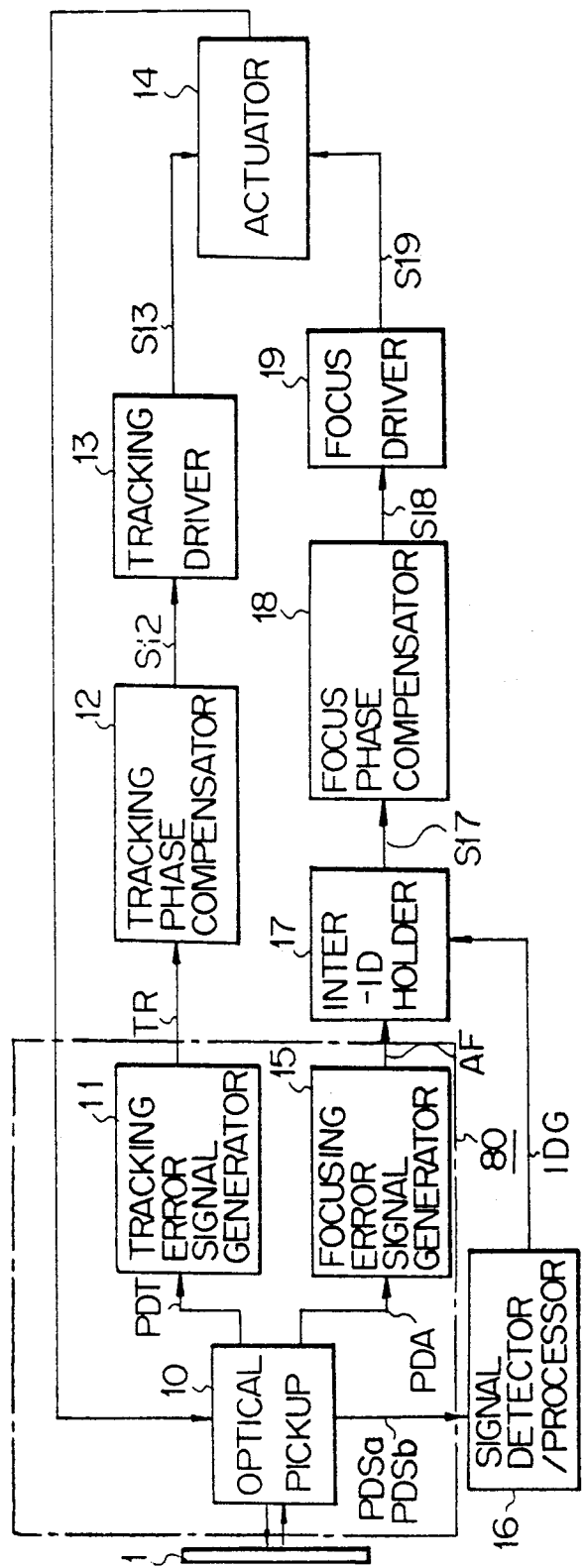
FIG. 1 is a block diagram of an optical disc system according to one embodiment of the present invention.

Referring first to FIG. 1, the optical disc system designated at numeral 80 has an optical pickup 10 constructed, for example, by the knife-edge method. The optical pickup 10 radiates an optical beam onto the optical disc 1 shown in FIG. 8 and, based on light reflected by the optical disc 1, outputs a signal PDA for the detection of any focusing error and another signal PDT for the detection of any tracking error. In addition, the optical pickup 10 also outputs address information formatted beforehand on the optical disc 1 as well as magnetic data signals PDSa,PDSb.

A tracking error signal generator 11 is connected to the optical pickup 10. Successively connected to this tracking error signal generator 11 are a tracking phase compensator 12, a tracking driver 13 and an actuator 14. A focusing error signal generator 15 and a signal detector/processor 16 are also connected to the optical pickup 10. An inter-ID holder 17 is connected to both output sides of the focusing error signal generator 15 and signal detector/processor 16. Connected to an output side of the inter-ID holder 17 is a focus phase compensator 18. To an output side of the focus phase compensator 18, the actuator 14 is connected via a focus driver 19. The optical pickup 10, tracking error signal generator 11 and focusing error signal generator 15 make up the optical disc system 80.

The tracking error signal generator 11 comprises a differential amplifier or the like and produces a tracking error signal TR on the basis of a signal PDT from the optical pickup 10. The tracking phase compensator 12 comprises, for example, a resistor and a capacitor and performs phase compensation for the tracking error signal TR in order to operate as a tracking servo. The tracking driver 13 comprises, for example, a voltage/current converter and a driver and outputs a drive current S13 in a tracking direction (i.e., the radial direction of the optical disc 1) in response to an output signal S12 from the tracking phase compensator 12. The actuator 14 shifts the optical pickup 10 in the tracking direction and in a focusing direction in response to the drive current S13 from the tracking driver 13 and a drive current S19 from the focus driver 19, respectively. The optical pickup 10, tracking error signal generator 11, tracking phase compensator 12, tracking driver 13 and actuator 14 make up a tracking servo control system.

The focusing error signal generator 15 comprises a differential amplifier or the like and generates a focusing error signal AF on the basis of the signal PDA from the optical pickup 10. The signal detector/processor 16 extracts address information formatted beforehand on the optical disc 1 on the basis of the signals PDSa,PDSb from the optical pickup 10, and also functions as an ID gate signal detector/generator means which detects each ID point and then generates an ID gate signal IDG indicating an address between the ID point and its next ID point as viewed in the tracking direction. The inter-ID holder 17 functions as a means for holding, based on the ID gate signal IDG, the focusing error signal AF at a signal level, which existed right before the first-mentioned ID point, between the first-mentioned ID point and the next ID point. The focus phase compensator 18 comprises, for example, a resistor and a capacitor and performs phase compensation for the output signal S17 from the inter-ID holder 17 in order to operate as a focusing servo. The focus driver 19 comprises a voltage/current converter, a driver and the like, and generates the drive current S19 in the focusing direction (i.e., in the direction of the optical disc) in response to the output signal S18 from the focus phase compensator 18. The optical pickup 10, focusing error signal generator 15, inter-ID holder 17, focus phase compensator 18, focus driver 19 and actuator 14 make up a focusing servo control system.

The construction of the optical pickup 10 shown in FIG. 1 will now be described by way of example with reference to FIG. 2. The optical pickup 10 is provided with a semiconductor laser 20, a collimator lens 21, a mirror 22, a polarization beam splitter 23 and an object lens 24 so that an optical beam can be radiated onto the optical disc 1. The optical pickup 10 is also equipped with a photodetector 25 for an external monitor; a polarization beam splitter 26, a knife-edge 27 and a photodetector 28 for the detection of any tracking error; and a convergent lens 29 and a photo-detector 30 for the detection of any focusing error. For the detection of signals, the optical pickup 10 is also provided with a ¼ wavelength plate 31, a polarization beam splitter 32, convergent lenses 33,36, photodetectors 34,37 and a mirror 35.

Figure 3:
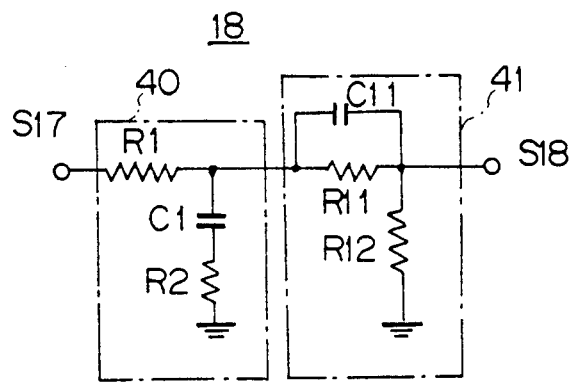
FIG. 3 is a circuit diagram illustrating one example of the focus phase compensator shown in FIG. 1.

The focus phase compensator 18 will next be described by way of example with reference to FIG. 3. The focus phase compensator 18 delays or advances the phase of each focusing error signal received via the inter-ID holder 17 so that the focusing servo can be compensated in phase. A phase delay circuit 40 and a phase advance circuit 41 are connected in series whereby phase compensation is performed. The phase delay circuit 40 comprises resistors R1,R2 and a capacitor C1, while the phase advance circuit 41 comprises resistors R11,R12 and a capacitor C11.

The signal detector/processor 16 shown in FIG. 1 will now be described by way of example with reference to FIG. 4. The signal detector/processor 16 comprises an adder 50, a subtractor 51, an ID gate signal generator 60 and the like. The adder 50 detects an ID signal IDS by adding the signals PDSa,PDSb, which have been outputted from the photodetectors 34,37 arranged inside the optical pickup 10, and outputs an ID signal IDS as a detection signal to the ID-gate signal generator 60. The adder 50 comprises a differential amplifier or the like. On the other hand, the subtractor 51 detects magnetic data recorded on the optical disc 1 by taking the difference between the signal PDSa and the signal PDSb. The subtractor 51 also comprises a differential amplifier or the like.

The ID gate signal generator 60 comprises a comparator 61, an AND gate 62 and a retriggerable monostable multivibrator 63. The comparator 61 converts the ID signal IDS into a binary signal in accordance with a threshold voltage Va and outputs a binary output ID signal S61. The retriggerable monostable multivibrator 63 receives the binary output ID signal S61 via the AND gate 62 and, by suitably setting the time constant, produces the ID gate signal IDG.

Figure 5:
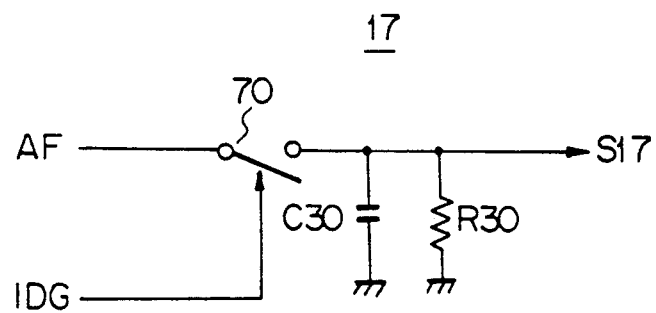
FIG. 5 is a circuit diagram showing one example of the inter-ID holder illustrated in FIG. 1.

One example of the inter-ID holder 17 in FIG. 1 is illustrated in FIG. 5. The inter-ID holder 17 is in the form of a sample-and-hold circuit, which comprises a switch 70 on/off-controlled by the ID gate signal IDG, a capacitor C30 and a resistor R30. This inter-ID holder 16 has the holding function that, when the switch 70 is opened, the signal level of the focusing error signal AF right before the opening of the switch 70 is held in terms of the discharge characteristics of the time-constant-setting capacitor C30 and resistor R30.

A description will next be made of the operation of the optical disc system constructed as described above.

Figure 2:
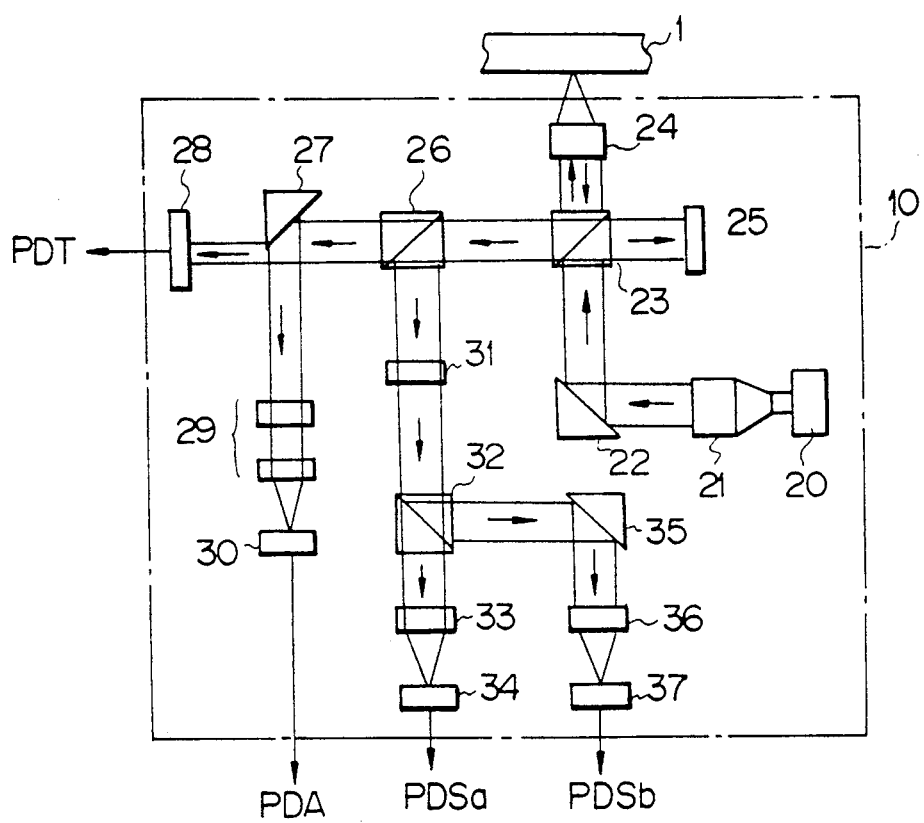
FIG. 2 is a block diagram showing one example of the optical pickup depicted in FIG. 1.
Figure 8:
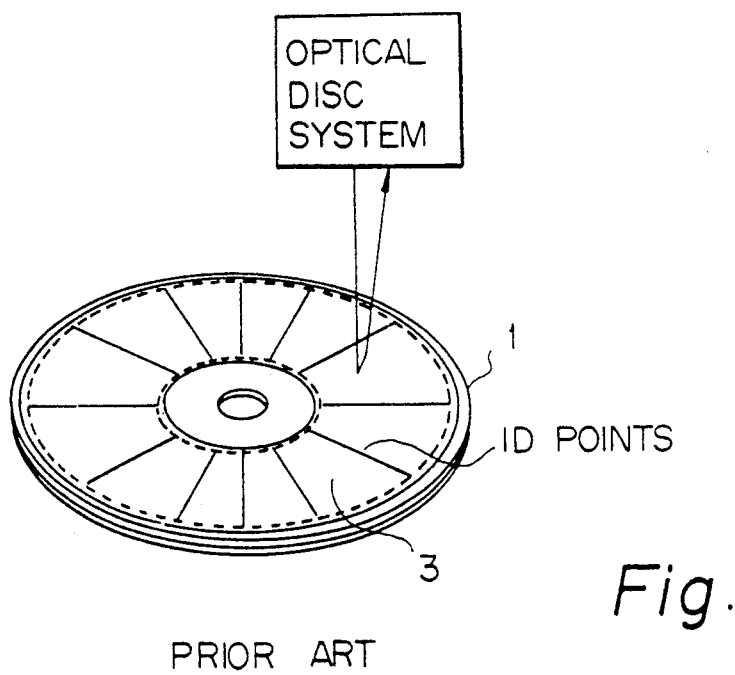
FIG. 8 is a perspective view of a prior art optical disc.
Figure 9:
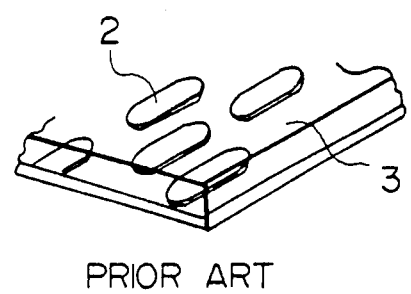
FIG. 9 is an enlarged view of an index point of the optical disc of FIG. 8.

When the optical disc 1 depicted in FIG. 8 is rotated by a spindle motor or the like, an optical beam outputted from the semiconductor laser 20 is converted into parallel light by the collimetor lens 21 at the optical pickup 10 depicted in FIG. 2. The light is reflected by the mirror 22, allowed to travel through the polarization beam splitter 23, converged by the object lens 24, and then radiated onto the optical disc 1. Light reflected by the optical disc 1 is allowed to travel through the object lens 24, changed in optical path by the polarization beam splitter 23, and then allowed to travel through the polarization beam splitter 26 and knife-edge 27, whereby the tracking error detecting signal PDT is detected at the photodetector 28. Further, light from the knife-edge 27 reaches the photodetector 30 through the convergent lens 29, so that the focusing error detecting signal PDA is detected by the photodetector 30.

On the other hand, the light changed in optical path by the polarization beam splitter 26 travels through the ¼ wavelength plate 31, polarization beam splitter 32 and convergent lens 33 and then reaches the photodetector 34, whereby the signal detecting signal PDSa is detected by the photodetector 34. Further, the light from the polarization beam splitter 32 reaches the photodetector 37 via the mirror 35 and convergent lens 36, whereby the signal detecting signal PDSb is detected by the photodetector 37.

Among the signals PDT,PDA,PDSa,PDSb detected by the optical pickup 10, the signal PDT is sent to the tracking error signal generator 11 shown in FIG. 1, the signal PDA to the focusing error signal generator 15, the signals PDSa,PDSb to the signal detector/processor 16.

At the tracking error signal generator 11, a tracking error signal TR is produced from the signal PDT. At the focusing error signal generator 15, on the other hand, the focusing error signal AF is produced from the signal PDA.

The focusing error signal AF is delivered to the inter-ID holder 17 and is then applied in the form of the output signal S17 to the focus phase compensator 18 via one terminal of the capacitor C30 and resistor R30 shown in FIG. 5. The output signal S17 from the inter-ID holder 17 is subjected to phase compensation by the phase delay circuit 40 and phase advance circuit 41 inside the focus phase compensator 18 and is inputted in the form of the output signal S18 to the focus driver 19. At the focus driver 19, the drive current S19 is produced based on the output signal S18 from the focus phase compensator 18, whereby the optical pickup 10 is shifted in the focusing direction by means of the actuator 14 to perform focusing control.

Next, the tracking error signal TR is subjected to phase compensation at the tracking phase compensator 12 and then inputted to the tracking driver 13. The tracking driver 13 produces the drive current S13 on the basis of the output signal S12 from the tracking phase compensator 12 so that the optical pickup 10 is shifted in the tracking direction by means of the actuator 14 to conduct tracing of a desired track in the optical disc 1. As a result, it is now ready to read data from the track.

Figure 4:
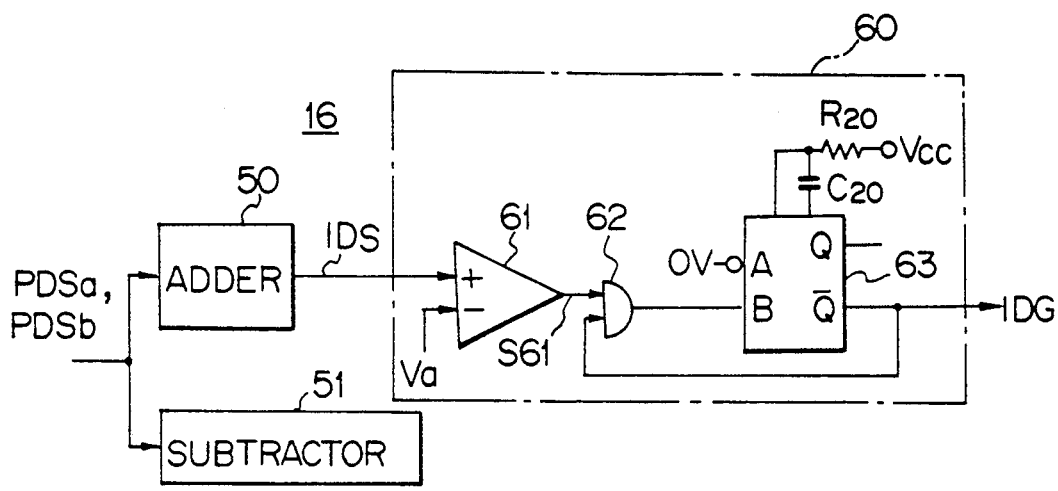
FIG. 4 is a block diagram depicting one example of the signal detector/processor illustrated in FIG. 1.

On the other hand, the signals PDSa,PDSb detected by the photodetectors 34,37 inside the optical pickup 10 are sent to the signal detector/processor 16 depicted in FIG. 4. When an optical beam is radiated onto an ID spot of the optical disc 1 through the object lens 24 shown in FIG. 2, the adder 50 adds the signals PDSa and PDSb at the signal detector/processor 16 so that the ID spot is detected. The ID signal IDS, a detection signal of the ID spot, is then inputted to the comparator 61.

Figure 6:
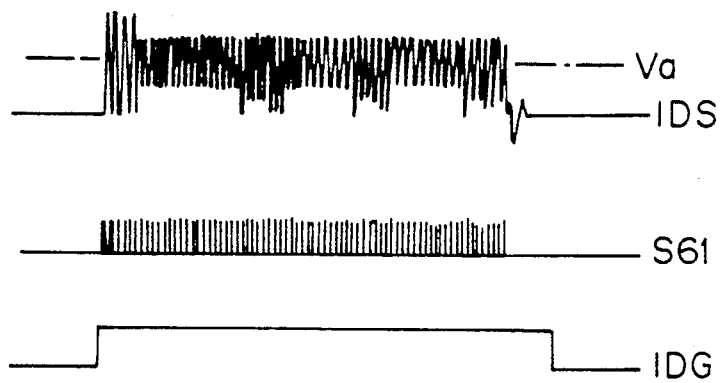
FIG. 6 is a waveform diagram of signals in FIG. 4.
Figure 7:
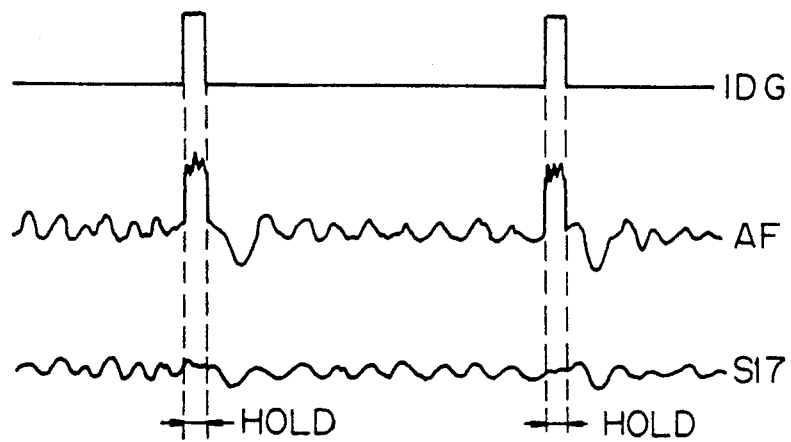
FIG. 7 is a waveform diagram of signals upon passage across ID points.

FIG. 6 is a waveform diagram of signals in FIG. 4, while FIG. 7 is a waveform diagram upon passage through ID spots.

As is shown in FIG. 6, at the comparator 61, the ID signal IDS is converted into a binary signal in accordance with the threshold voltage Va so that the binary output ID signal S61 is produced. This binary output ID signal S61 is then supplied to the retriggerable monostable multivibrator 63 via the AND gate 62. This retriggerable monostable multivibrator 63 has been set at an appropriate time constant by the resistor R20 and capacitor C20, whereby the ID gate signal IDG indicating the address between the corresponding ID points is produced. This ID gate signal IDG is then inputted to the inter-ID holder 17 illustrated in FIG. 5.

At the inter-ID holder 17, the switch 70 is opened by the rise of the ID gate signal IDG. Using as an initial value the level of the focusing error signal AF right before the rise of the ID gate signal IDG, the level of the output signal S17 from the inter-ID holder 17 drops in accordance with the time constant of the capacitor C30 and resistor R30. If the time constant of the capacitor C30 and resistor R30 is set at a value substantially large for the address between the ID points, the output signal S17 from the inter-ID holder 17 is held, as depicted in FIG. 7, at the level of the focusing error signal AF which existed right before the passage across the ID point.

Figure 10:
FIG. 10 is a waveform diagram of a focusing error signal and a focusing drive current in the prior art optical disc system.
Figure 10:
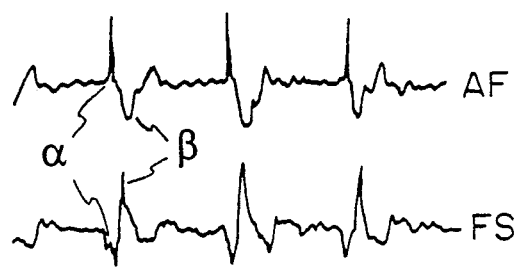

The optical disc system according to the above embodiment is provided with the signal detector/processor 16 for detecting each ID point of the optical disc 1 and producing the ID gate signal IDG and also with the inter-ID holder 17 for holding, based on the ID gate signal IDG, the focusing error signal AF at the signal level right before the passage across the ID point, whereby, during the passage across the ID point, the focusing error signal AF is held at the signal level which existed right before the passage across the ID point. As a result, the influence of the α section to the focusing servo at each ID point, said influence being depicted in FIG. 10, has been eliminated and, moreover, the β section as a response of the focusing servo to the influence has also been eliminated. Owing to this, the focusing servo can be smoothly operated even upon passage of the optical beam across each ID point, thereby making it possible to eliminate noise in the focusing direction during high-speed rotation of the optical disc.

It is to be noted that the present invention is not limited to the illustrated embodiment and various modifications are feasible. The followings are examples of its modifications.

(1) In the above embodiment, focusing servo control is conducted by holding a focusing error signals between ID points. Application of a similar holding method to the tracking servo control system makes it possible to reduce the noise further during rotation of an optical disc.

(2) It is possible to use such a circuit construction as holding a signal subsequent to passage through the focus phase compensator 18 by constructing the inter-ID holder 17 of FIG. 1 as a circuit different from that shown in FIG. 5, inputting the focusing error signal AF to the focus phase compensator 18, inputting the output signal S18 from the focus phase compensator 18 to the inter-ID holder 17 and then inputting the output signal S17 from the inter-ID holder 17 to the focus driver 19.

(3) Various other modifications are also feasible, including the provision of the tracking error signal generator 11 and focusing error signal generator 15, both shown in FIG. 1, inside the optical pickup 10; the construction of the optical pickup 10, signal detector/processor 16, focus phase compensator 18 and the like into circuits different from those illustrated in the drawings; and the application of the present invention as a magneto-optic disc system.

We claim:

1. An optical disc system comprising:
an optical pickup means for radiating an optical beam onto an optical disc with plural index points formed thereon, detecting any focusing error and any tracking error from light reflected by the optical disc, and then outputting a focusing error signal and a tracking error signal to a focusing servo control signal system and a tracking servo control system, respectively;
a drive means for outputting a focusing drive current and a tracking drive current on the basis of the focusing error signal and tracking error signal, respectively;
an actuator for shifting the optical pickup means in a focusing direction and in a tracking direction by the focusing drive current and the tracking drive current, respectively;
a signal detection and processing means for detecting each of the index points and generating an index gate signal indicating an address between the index point and another index point next to the first-mentioned index point in the tracking direction; and
a holding means for holding, based on the index gate signal, the focusing error signal for a predetermined time at a signal level right before the first-mentioned index point.

2. The system of claim 1, wherein said holding means comprises a switch for preventing input of the focusing error signal, and a resistor and a capacitor both connected in parallel relative to the focusing error signal.

3. The system of claim 2, wherein the switch is turned off by input of the index signal so that the input of the focusing error signal is prevented.

* * * * *